(12) United States Patent
De Girolamo et al.

(10) Patent No.: US 7,023,796 B2
(45) Date of Patent: Apr. 4, 2006

(54) METHOD FOR IDENTIFYING THE CURRENT ROUTE OF PATHS IN TELECOMMUNICATIONS MS-SPRINGS

(75) Inventors: Claudio De Girolamo, Corsico (IT); Andrea Mazzini, Pessano con Bornago (IT)

(73) Assignee: Alcatel, Paris (FR)

(*) Notice: Subject to any disclaimer, the term of this patent is extended or adjusted under 35 U.S.C. 154(b) by 902 days.

(21) Appl. No.: 09/771,436

(22) Filed: Jan. 30, 2001

(65) Prior Publication Data
US 2003/0198181 A1  Oct. 23, 2003

(30) Foreign Application Priority Data
Feb. 1, 2000   (IT)   ............... MI2000A0139

(51) Int. Cl.
*G01R 31/08* (2006.01)
*H04L 12/28* (2006.01)
*G02F 1/00* (2006.01)

(52) U.S. Cl. .............. 370/222; 370/242; 370/403; 398/3; 398/4

(58) Field of Classification Search .......... 370/216, 370/221, 222, 223, 224, 227, 228, 400, 406
See application file for complete search history.

(56) References Cited

U.S. PATENT DOCUMENTS

| | | | |
|---|---|---|---|
| 6,324,162 B1* | 11/2001 | Chaudhuri | 370/225 |
| 6,526,020 B1* | 2/2003 | Ando | 370/223 |
| 6,535,481 B1* | 3/2003 | Andersson et al. | 370/225 |
| 6,577,594 B1* | 6/2003 | Abbas et al. | 370/222 |
| 6,760,302 B1* | 7/2004 | Ellinas et al. | 370/228 |

OTHER PUBLICATIONS

ITU-T G.707 International Telecommunication Union, Mar. 1996.
ITU-T G.774 International Telecommunication Union, Sep. 1992.
ITU-T G.783 International Telecommunication Union, Apr. 1997.
ITU-T G.841 International Telecommunication Union, Oct. 1998.

* cited by examiner

*Primary Examiner*—Hanh Nguyen
(74) *Attorney, Agent, or Firm*—Sughrue Mion, PLLC

(57) ABSTRACT

A method of identifying the current route of paths on communications MS-SPRINGs is described. The method comprises the steps of providing the network manager with information relating to the Nominal Route of the at least one path; and providing the management system with information of current status of the at least one network element, and being characterized by comprising the steps of processing the information provided through steps a) and b) so as to calculate the current route of the at least one path. The invention further concerns a network manager able to carry out the various steps of the method.

5 Claims, 2 Drawing Sheets

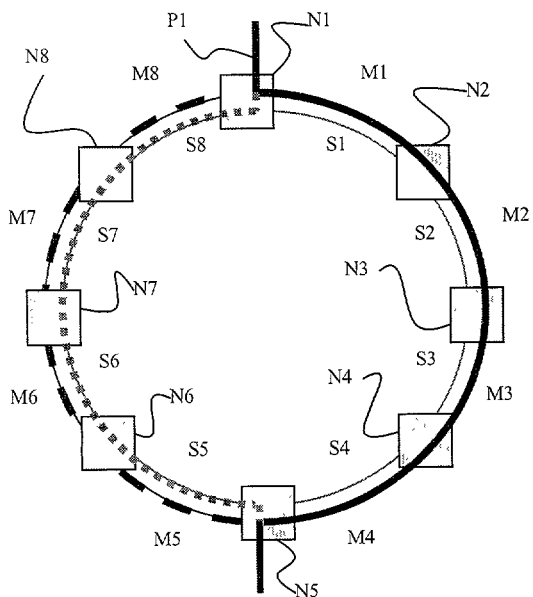
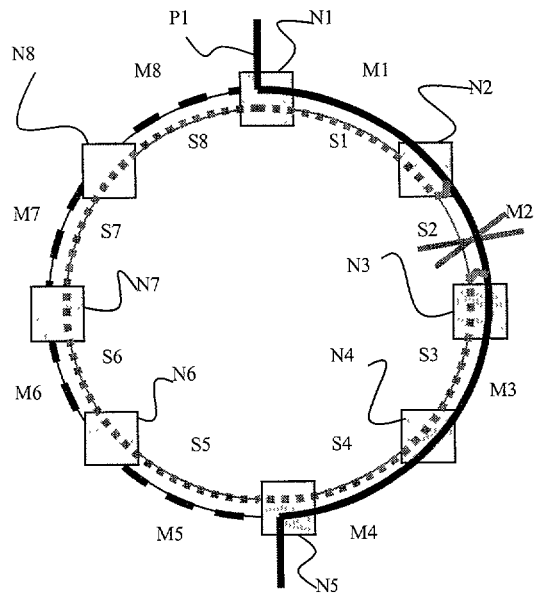
Fig. 1a  Fig. 1b
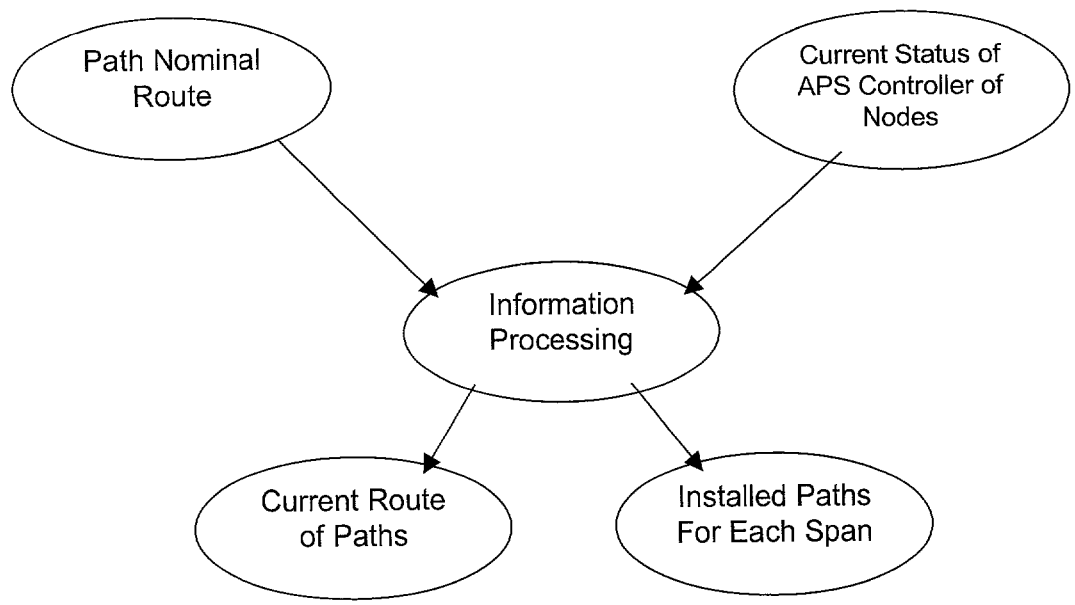
Fig. 2

METHOD FOR IDENTIFYING THE CURRENT ROUTE OF PATHS IN TELECOMMUNICATIONS MS-SPRINGS

BACKGROUND OF THE INVENTION

1. Field of the Invention

The present invention relates to a method for identifying the current route of paths in telecommunications MS-SPRINGS.

2. Description of the Prior Art

As it is known, the existing ring-shaped optical telecommunications networks comprise nodes which are joined by spans, which spans are equally shared between working channels and protection channels. It is thus possible to protect the information traffic on said telecommunications network by carrying out switching operations between working channels and protection channels. The switching operations are driven by protection words which are exchanged between the nodes of said telecommunications networks.

In current telecommunication networks it has become very important to have the capability of restoring faults possibly occurring in the networks themselves without impairing the functionality of the service. Therefore, the telecommunications networks, and in particular the fiber-optic networks, are provided with means protecting the networks themself against possible failures of network elements (namely, nodes), network spans or network components.

In the MS-SP (Multiplex Section Shared Protection) RING networks, for instance, a shared protection mechanism is implemented, which mechanism allowing the automatic traffic restoration in case of defects or failures in connection fibers. In other words, the MS-SPRING networks perform the automatic traffic restoration through a synchronized re-routing of said traffic, which is carried out at each node of the ring. The operation is controlled by a protocol consisting of 16-bit patterns that are continuously exchanged between adjacent nodes. Said protocol and the operations involved thereby in connection with the different bit patterns are defined by many International Standards, issued by ANSI, by ITU-T and by ETSI, and are characterized by a certain set of rules and messages. See, for instance, ITU-T Recommendation G. 841.

The protection in an MS-SPRING is implemented according to a "Bridge and Switch" technique that substantially consists in re-routing the traffic, through a proper modification of the internal connections of the network elements, switching it from the working capacity to the protection capacity.

The Bridge operation substantially causes a node to transmit the same traffic over both the working capacity and the protection capacity, whereas the Switch operation corresponds to a selection of the traffic traveling over the protection capacity instead of the traffic traveling over the working capacity.

Such a protection technique, requires for each network element be provided, inside thereof, with a device, an APS (Automatic Protection Switch) controller, which is able to detect any line failures, to send and receive information concerning the other network elements by means of said protocol, and carry out the Bridge and Switch actions.

In the four-fiber rings, the fault restoring occurs in accordance with two different ways: in case of failure at the sole working capacity of a given span, the traffic is rerouted over the corresponding protection capacity of the same span (span rerouting), whereas in case of failure of both the working capacity and the protection capacity of a span, the traffic is re-routed over the ring (ring rerouting) in such a way as to travel the alternative route joining the two termination nodes so as to avoid crossing the failed span. Obviously, in two-fiber rings, being the working and the protection capacities both allocated on the same bi-directional fiber pair, only the ring rerouting is applicable.

The Standards define two different types of MS-SPRING protection mechanisms: the classic and the transoceanic algorithms, the latter algorithm being especially fit for networks involving distances between nodes on the order of thousands of kilometers. The two algorithms allow the achievement of the same result in terms of traffic protection still using different rerouting methods.

In accordance with the Standards (see ITU-T G. 774) defining the information content that an SDH network element is obliged to supply to the management system, in case of an MS-SPRING each network element must communicate the current status of its APS controller. The values of this status can be:

the node is requesting the intervention of the protection mechanism to serve an event (namely, a failure or a user command) resulting in a span rerouting; in this case the node is termed "span node" for the sake of conciseness;

the node is requesting the intervention of the protection mechanism to serve an event (namely, a failure or a user command) resulting in a ring re-routing; in this case the node is termed "ring node" for the sake of conciseness;

the node is not requesting the intervention of the protection mechanism (this macro general state may correspond to different elementary states: no events, events of failures in protection spans only, "pending" events, namely those events which can not be served immediately, protocol failure events, condition of intermediate node, namely the condition of a node that declares to accept the request of other span or ring nodes).

Every ring network span which is affected by an event that the protocol, on the basis of the priorities of all the events existing in the ring, has decided to serve (namely to reroute the protected traffic that has been lost because of the event itself) must always have a pair of span or ring nodes at its two ends.

In any case, for the network manager the problem to be solved is to know, at any time, which paths are currently carried in a given span. The current route of each path can in fact be different from its nominal route if the path itself has been rerouted in order to protect it against failures or it has been rerouted upon commands sent by the user (for instance to perform the maintenance).

For instance, a protected path which, in a failure-free condition is carried on the working capacity of a given span of a four-fiber ring, will be subjected to a span rerouting and carried on the protection capacity of the same span, should a failure affect the working fiber. Hence, by using the present network management systems, the network manager only knows the status of the APS controller of the nodes but it does not know exactly which paths are carried on a given span, at the time when events resulting in the rerouting of the paths occur.

An attempt to solve such a problem consists in a standardized mechanism, called "Path Trace" (see ITU-T G. 707 for the arrangement thereof in the SDH frame and ITU-T G. 783 for the operation aspects) mainly designed to detect misconnections. A further alternative could be that in which the various nodes report the path status to the management system instead of reporting the status thereof. This, however, would be at present possible for transoceanic rings only, wherein the nodes know the entity "path", but it is impossible for the classic application. Moreover, the application of this mechanism would result in a lot of work to redesign the internal structure handling messages in the SDH apparatus.

SUMMARY OF THE INVENTION

Therefore, the main object of the present invention is providing a method for identifying the current route of paths in telecommunications MS-SPRINGS that is rather simple, reliable, universal (namely, usable both in transoceanic and in classic rings) and that does not result in the need to redesigns the SDH apparatus.

This and further objects are achieved by a method having the characteristics set forth in the independent claim 1. The method according to the invention could advantageously and indifferently be implemented through a proper hardware or software and for this reason the scope is held to be extended to the computer software programs implementing the method, to the storage medium on which these program are recorded and to the computer on which said software programs are run.

Clearly, a method in accordance with the invention is considered particularly useful to the network manager which would have not only the knowledge of the status of the individual nodes of the ring but also the most complete view of the current route of the paths.

The basic idea of the present invention is to derive the information at path level from reports at node level that are just provided by these nodes via a suitable processing of the various reports.

The invention will certainly become understood after reading the following detailed description, given by way of a non limiting example to be read with reference to the attached drawing sheets.

BRIEF DESCRIPTION OF THE DRAWINGS

In the drawings:

FIGS. 1a and 1b schematically show a telecommunications transoceanic ring and a telecommunications classic ring with a plurality of nodes, respectively;

FIG. 2 schematically shows the main steps of the method according to the present invention.

BEST MODE FOR CARRYING OUT THE INVENTION

Figure 3:
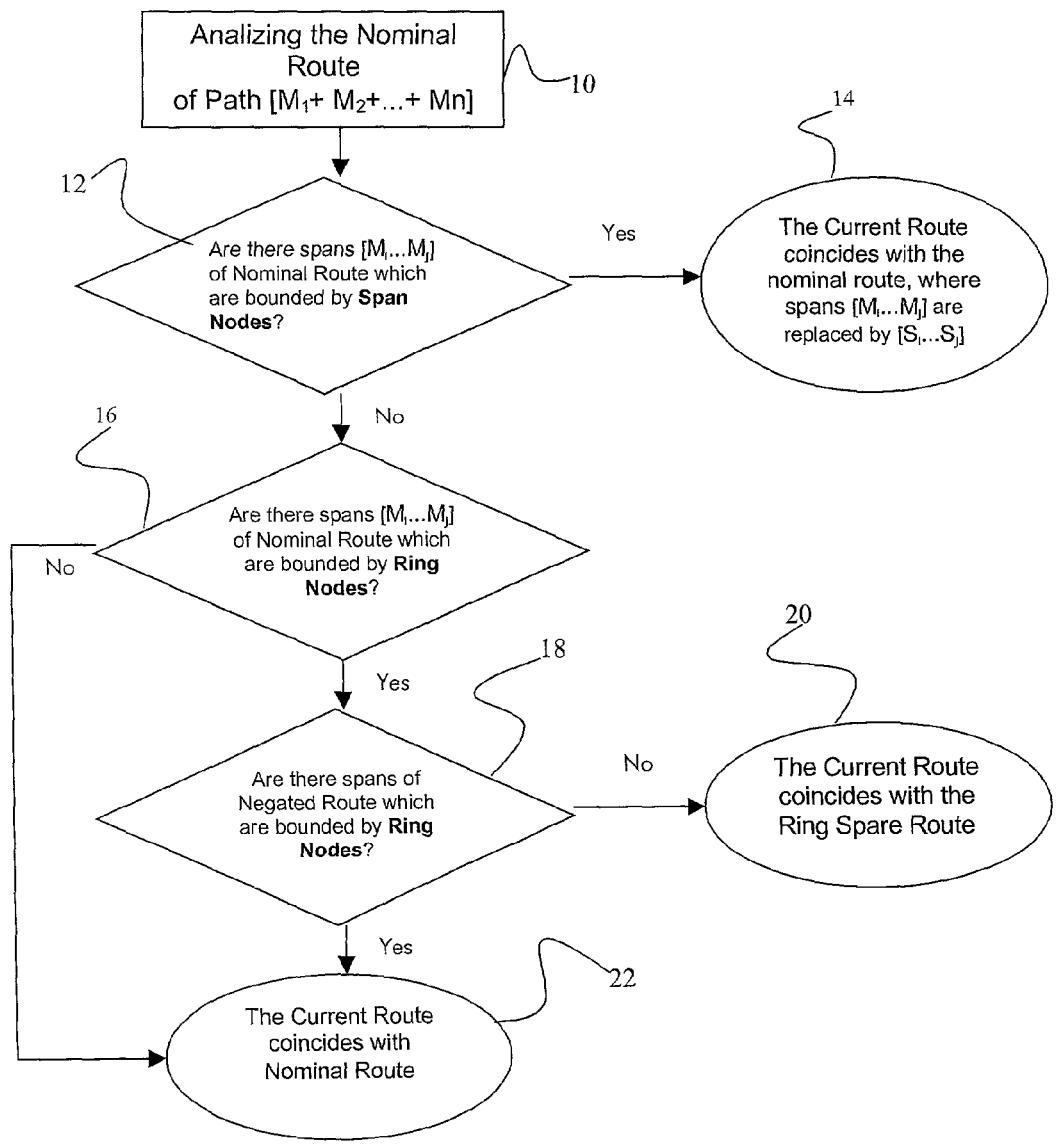
FIG. 3 shows the processing steps of the method according to the invention.

Before describing the invention in detail, it is well to point out the following definitions, however considered as known to a person skilled in the art:

Path (PTH): logical route connecting two or more network elements (nodes) of the ring;

Protected Path (PTP): a path which is allocated on the working capacity;

Low Priority Path (LPP): a path which is allocated on the protection capacity;

Nominal Route (NMR): the set of (Main) spans which are allocated on the working capacity and are traveled by the protected path under normal conditions, namely under conditions free of failures or without any user commands. As will be clear from FIGS. 1a and 1b, the Nominal Route for the path which is represented by a bold line is $M_1+M_2+M_3+M_4$. The generic working span is indicated as Mj.

Negated Route (NGR): the set of working (Main) spans not traveled by the protected path under normal (namely, free of failures and commands) conditions. As will be clear from FIGS. 1a and 1b, the negated route (represented by a long dash line) for the shown path is $M_5+M_6+M_7+M_8$.

Ring Spare Route (RSR): the set of the working and/or protection (spare) spans traveled by the protected path when it is re-routed because of a failure or a user command. As it is clear from FIG. 1a, for the transoceanic application, the Ring Spare Route is $S_8+S_7+S_6+S_5$ whereas, for the classic application, the Ring Spare Route for the represented path is $M_1+S_1+S_8+S_7+S_6+S_5+S_4+S_3+M_3+M_4$ (FIG. 1b). The generic spare span is $S_j$.

The method for identifying the current route of paths in a telecommunications MS-SPRINGS network, comprises the steps of:

a) providing the network manager with information relating to the Nominal Route of the at least one path; and b) providing the network manager with information of current status of the at least one network element, and is characterized by comprising the steps of:

c) processing the information provided through steps a) and b) so as to calculate the current route of the at least one path.

The method according to the invention is schematically represented in FIG. 2.

In detail, with reference to FIG. 3, the step c) of processing the various informations comprises the steps of:

c1) analyzing (block 10) the nominal route of the paths $(M_1+M_2+\ldots M_n)$;

c2) verifying (block 12) if any of the nominal route spans $(M_j)$ comprises a span node. In the affirmative (block 14) one may deduce that the Current Route fundamentally coincides with the Nominal Route where the main spans $(M_j)$ are replaced by spare spans $(S_j)$. If not c3) verifying (block 16) if any of the Nominal Route spans $(M_j)$ comprises a Ring Node. If not, the Current Route coincides with the Nominal Route (block 22). In the affirmative c4) verifying (block 18) if any spans (Mj) of the Negated Route comprises a ring node. If not (block 20), the current route coincides with the Ring Spare Route; in the affirmative (block 22) the current route coincides with the Nominal Route. In fact, if the Negated Route is broken as well, there is no chance of saving the path by changing the travel thereof.

Through this processing, it is thus possible to know in a reliable manner the current route of each path. As explained above, the path can change because of possible failures or of willful breakings imparted by an operator to the network, e.g. for maintenance purposes. Once the current route of each path, with the path comprising a set of spare spans (Sj) and/or main spans (Mj), is identified, one can easily realize which paths travel (namely, are installed in) a certain span in a given time. This is particularly useful if maintenance operations are to be performed: before operating on a given span, it is possible to know what paths are potentially involved.

Referring again to FIG. 1a, the method according to the invention will be applied to the path P1 in a Transoceanic ring. The Nominal Route of path P1 (not dashed bold line) is $M_1+M_2+M_3+M_4$ (block 10). In absence of failures or breakings in the Transoceanic ring there will be neither span nodes nor ring nodes (block 16) and therefore the current path will coincide with the Nominal Route (block 2). In the case where one of the working spans, for instance $M_2$, becomes broken, the nodes N2 and N3 would become Span Nodes (block 12) and therefore (block 14) the current route will coincide with the nominal route having the foresight to replace the working span $M_2$ with the spare span $S_2$: the current route will become $M_1+S_2+M_3+M_4$. In the case where both the working span $M_2$ and the protection span $S_2$ are broken (block 16), the nodes $N_2$ and $N_3$ would become Ring Nodes (block 18) and hence the current route would coincide (block 20) with the Ring Spare Route that, for transoceanic rings, is given by $S_8+S_7+S_6+S_5$. Should, in addition to a failure at $M_2$ and $S_2$, a ring failure at one or more of the spans $M_8\&S_8$ or M7&S7 or $M_6\&S_6$ or $M_5\&S_5$ also occur, and therefore some spans (Mj) of the Negated Route are bounded by a Ring Node (block 18), then the current route would coincide with the nominal route (block 22) $M_1+M_2+M_3+M_4$ (in other words, there is no chance of saving the path and thus there is no reason to re-route the path itself).

As far as the application to a Classic or Terrestrial ring (FIG. 1b) is concerned, the nominal route of path P1 is still $M_1+M_2+M_3+M_4$ (block 10). In a condition free of failures or breakings in the ring there will be neither Span Nodes nor Ring Nodes and therefore the current route will coincide again with the nominal route (block 22). In the case where one of the working spans, for instance $M_2$, becomes broken, the nodes $N_2$ and $N_3$ would become Span Nodes (block 12) and therefore the current route will coincide with the nominal route having the foresight to replace the span $M_2$ with the span $S_2$ (block 14): the current route will become $M_1+S_2+M_3+M_4$. In the case of rinf failure (wherein both the working span $M_2$ and the protection span $S_2$ have become broken), the nodes $N_2$ and $N_3$ would become Ring Nodes (block 16) and hence the current route would become the spare ring one (block 20) namely, for classic rings, $M_1+S_1+S_8+S_7+S_6+S_5+S_4+S_3+M_3+M_4$. Also in this case if, in addition to a ring failure at $M_2$ and $S_2$, a ring failure at one or more of the spans $M_8\&S_8$ or $M_7\&S_7$ or $M_6\&S_6$ or $M_5\&S_5$ (block 18) also occurs, then the current route would coincide with the Nominal Route (block 22) $M_1+M_2+M_3+M_4$ (in other words, there is no chance of saving the path and thus there is no reason to re-route the path itself).

The present invention further comprises a management system (or network manager) able to carry out the various steps of the above-described method. In particular, it comprises means designed to receive information concerning the nominal route of each path; means designed to receive information coming from every network element of the ring network and concerning the current status of the APS controller; means designed to process the above indications so as to calculate the current route of every path; and means that, having calculated the current route of every path, for a given span are capable of identifying the paths carried at such span. In particular, the processing means comprise means to analyze (block 10) the nominal route of paths $(M_1+M_2+\ldots+M_n)$; means to verify (block 12) if any spans $(M_j)$ of the Nominal Route are bounded by a Span Node; means to verify (block 16) if any spans $(M_j)$ of the nominal route are bounded by a Ring Node; and means to verify (block 18) if any spans [Mj] of the Negated Route are bounded by a Ring Node.

As said above, the method according to the present invention can be implemented by any means, both hardware and software. Therefore, the scope of the present invention includes a computer software program comprising code means designed to carry out all the aforesaid steps of the method when said program is run on a computer.

Similarly, the invention also extends to a computer-readable medium having a software program recorded thereon, said computer-readable medium comprising code means adapted to carry out all the steps of the method of the invention when said program is run on a computer.

Lastly, although the invention has been described only with reference to SDH syinchronous transmissions, it is well applicable to other types of transmissions such as SONET. Thus, any specific reference to the SDH wording, as far as the present application is concerned, will include the corresponding SONET wording; the scope of the invention does include SONET transmissions.

There have thus been shown and described a novel method and a novel management system which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for identifying the current route of paths in a telecommunications MS-SPRINGS network, the MS-SPRING network comprising:

network elements or nodes, each node comprising a controller, the controller comprising controller status;

fiber optic spans interposed between the network elements to form a ring, each network element being connected to adjacent network elements through said fiber optic spans allowing a bidirectional communication therebetween;

at least one path connecting two or more network elements of the ring, the at least one path, in a network free-of-failure condition, following a corresponding at least one Path Nominal Route;

a network manager; and a mechanism for protecting traffic travelling in the network, said protection mechanism being shared in the network and being operated by the network manager, the method comprising:

(a) providing the network manager with information relating to the Nominal Route of the at least one path; and (b) providing the network manager with information of current status of the at least one network element, wherein it comprises the step of:

(c) processing, at the network manager, the information provided through steps (a) and (b) so as to calculate the current route of the at least one path, by:

(c1) analyzing the Path Nominal Route of the at least one path;

(c2) making a determination as to whether at least one of the Nominal Route spans comprises a node requesting the intervention of the protection mechanism to serve a failure or a user command resulting in a span re-routing;

(c3) when the determination in (c2) is in the affirmative, declaring that the current route coincides with the nominal route, with a main span being replaced by a spare span; and (c4) when the determination in (c2) is in the negative, checking for ring re-routing by determining whether at least one of the spans of the Nominal Route is bounded by a node requesting the intervention of the protection mechanism to serve a failure or a user command resulting in a ring re-routing.

2. A method according to claim 1, further comprising identifying what paths are carried at a given span.

3. A method according to claim 1, further comprising declaring that the current route coincides with the Nominal Route when the check for ring re-routing is negative.

4. A method according to claim 3, further comprising:
when the check for ring re-routing is affirmative, making a negated route ring determination as to whether any spans of the negated route comprise a ring node;
when the negated route ring determination is negative, declaring that the current route coincides with the Ring Spare Route; and
when the negated route ring determination is affirmative, declaring that the current route coincides with the nominal route.

5. A computer-readable medium having a program recorded thereon, said computer-readable medium comprising computer program code means adapted to perform all the steps of claim 1 when said program is run on a computer.

* * * * *